United States Patent
Arndt et al.

(10) Patent No.: US 6,523,140 B1
(45) Date of Patent: Feb. 18, 2003

(54) COMPUTER SYSTEM ERROR RECOVERY AND FAULT ISOLATION

(75) Inventors: Richard Louis Arndt, Austin, TX (US); Danny Marvin Neal, Round Rock, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/414,337

(22) Filed: Oct. 7, 1999

(51) Int. Cl.$^7$ .................................................. H02H 3/05
(52) U.S. Cl. ........................................... 714/44; 714/43
(58) Field of Search .......................... 714/8, 9, 5, 43, 714/44, 56; 710/20, 21

(56) References Cited

U.S. PATENT DOCUMENTS

| | | | | |
|---|---|---|---|---|
| 5,499,346 A | * | 3/1996 | Amini et al. | 710/128 |
| 5,790,870 A | * | 8/1998 | Hausauer et al. | 710/260 |
| 5,815,649 A | * | 9/1998 | Utter et al. | 714/6 |
| 5,838,899 A | * | 11/1998 | Leavitt et al. | 714/56 |
| 5,987,554 A | * | 11/1999 | Liu et al. | 710/129 |
| 6,182,180 B1 | * | 1/2001 | Liu et al. | 710/129 |
| 6,279,125 B1 | * | 8/2001 | Klein | 714/38 |
| 6,286,125 B1 | * | 9/2001 | Leshay et al. | 714/807 |

* cited by examiner

Primary Examiner—Dieu-Minh Le
(74) Attorney, Agent, or Firm—Robert V. Wilder; Mark E. McBurney

(57) ABSTRACT

A method and implementing computer system is provided in which specific device identification information is acquired when a faulty condition is detected during an information transfer transaction, and the condition is reported to the device driver of the identified device for corrective action without initiating a system shut-down. In one example, PCI adapter sequence information, including tag number, requester bus number, requester device number and requester function number is captured and used in reporting an error condition in order to identify and isolate the adapter in a recovery operation.

13 Claims, 4 Drawing Sheets

COMPUTER SYSTEM ERROR RECOVERY AND FAULT ISOLATION

FIELD OF THE INVENTION

The present invention relates generally to information processing systems and more particularly to a methodology and implementation for processing detected fault conditions in transactions from adapter devices.

BACKGROUND OF THE INVENTION

In all computer systems, devices connected within the system are generally able to communicate and initiate data transfer transactions with other devices in the system as well as with the system memory, system processors and other system central components. These transactions transpire in the form of one or more lines of information being passed from one device in a system to another device in the system. In a specific example, current PCI (peripheral component interconnect) computer systems are able to have many PCI bridge circuits connected between a main system bus and a plurality of PCI busses. Each PCI bus, in turn, may have several adapter devices connected thereto. For large systems, this tree-like configuration can become quite complex and extensive.

In transferring information between system components such as system memory to or from any of the adapter devices, or between any two adapter devices in the computer system, segments or lines of information are placed on system busses between the devices participating in the transaction in a predetermined sequence. The transfer of information from one device to another generally occurs in discrete steps with stops along the way. The information being transferred may, for example, move from one adapter device on one PCI bus to system memory. In an extensive computer system, that journey may pass through several bridge circuits along the way, and the information may be temporarily stored in transit buffers at each of the bridge circuits. Among other things, this step-by-step transaction process allows for a prioritization and/or ordering system in which certain transactions are able to bypass other transactions.

If, however, an error occurs on one of the busses involved in a transaction, it may result in a system error report that is effective to terminate all system operations. For example, in a PCI environment, if a transaction is clear on a primary bus of a bridge, and an error occurs on the secondary bus, then a PCI "SERR" signal is generated which causes a system shut-down rather than risk the propagation of erroneous data caused by the detected error condition.

Thus, all devices in the system as well as the system itself may be totally shut-down because of an easily correctable error condition in only one of the adapter devices in the system.

Thus, there is a need for an improved methodology and implementing system which enables an identification and isolation of specific adapter devices which are detected to have caused detected error conditions in a computer system.

SUMMARY OF THE INVENTION

A method and implementing computer system is provided in which specific device identification information is acquired when a faulty condition is detected during an information transfer transaction, and the condition is reported for corrective action without initiating a system shut-down. In an exemplary PCI system, the PCI adapter sequence information, including tag number, requester bus number, requester device number and requester function number is captured and used in reporting an error condition to the adapter's device driver in order to identify and isolate the adapter in a recovery operation.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
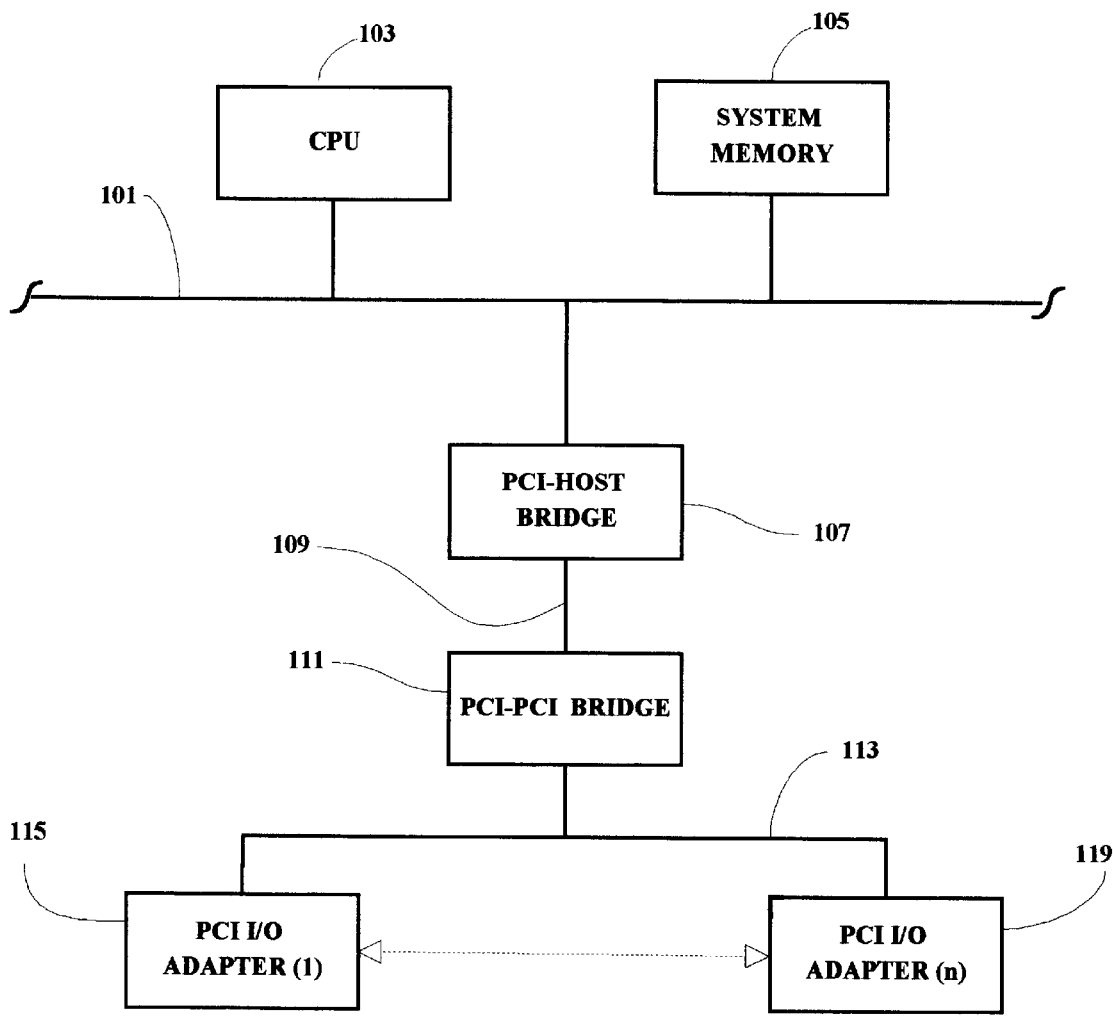
FIG. 1 is a diagram of a computer system in which the present invention may be implemented.

The various methods discussed herein may be implemented within a typical computer system which may include a server, workstation or personal computer. In general, an implementing computer system may include a plurality of processors in a multi-bus system in a network of similar systems. However, since the workstation or computer system implementing the present invention in an exemplary embodiment, is generally known in the art and composed of electronic components and circuits which are also generally known to those skilled in the art, circuit details beyond those shown in the drawings are not specified to any greater extent than that considered necessary as illustrated, for the understanding and appreciation of the underlying concepts of the present invention and in order not to obfuscate or distract from the teachings of the present invention.

In FIG. 1, an exemplary PCI computer system is illustrated which includes a system bus 101 to which is connected a CPU 103 and system memory 105. The present invention is herein described as implemented in a PCI computer system although it is understood that the present invention may also be applied in other computer environments. Further, as used in the example, the term "PCI" includes current versions as well as future versions and extensions of the basic PCI architecture. Referring again to FIG. 1, the bus 101 may also include additional CPUs and network connections (not shown). A PCI-to-Host Bridge (PHB) 107 is also coupled to the system bus 101 at a primary side of the PHB 107, and a secondary side of the PHB 107 is coupled to a primary side of a PCI-to-PCI Bridge (PPB) 111 through a first PCI bus 109. The PCI system may also include more than one PPB although only one is illustrated for simplicity. The secondary side of the PPB 111 in the exemplary embodiment is connected to another PCI bus 113, which, in turn, is coupled to a plurality of adapter slots which are arranged to be connected to a plurality (typically from one to six devices) of PCI I/O adapter devices 115–119 which are illustrated as PCI I/O Adapter(1) through PCI I/O Adapter(n), respectively.

As information transactions are sent from one device in the system to another, the transactions are buffered in intermediate bridge buffers along the way as the transactions proceed in a step-by-step process. Thus, if information is being sent from PCI I/O Adapter 115 to system memory 105, the request for that transaction will be buffered at the secondary side of the PPB 111 while awaiting access to the PCI bus 109 on the primary side of the PPB 111. After being granted access to the bus 109, the information in the transaction may be buffered at the secondary side of the PHB 107 while access to the system bus 101 is being arbitrated. In PCI systems, at each step along the way, checks are conducted to determine if the transaction is valid or if any errors (parity or other system errors) have been detected. Heretofore, as noted above, when such errors have been detected, particularly for write transactions which do not return results to the initial requester, it has usually resulted in a system shut-down until the errors can be corrected in order to prevent propagation of corrupted data. The present invention however enables the association of a detected error condition with a specific adapter device for example, such that the error is identified and isolated without requiring a total system shut-down.

In an exemplary PCI transaction, information is passed from one device to another in a series of phases. One of the phases in the example is referred to as an attribute phase. Attributes are additional information that is included with each transaction to further define the transaction. During the attribute phase, the initiator of the transaction drives attributes onto the appropriate bus. In one example, the attribute phase is a single clock duration regardless of the width of the data transfer or the width of the address associated with the data transfer. In the illustrated PCI example, several of the bit assignments in a requester attribute format are illustrated in FIG. 2.

Figure 2:
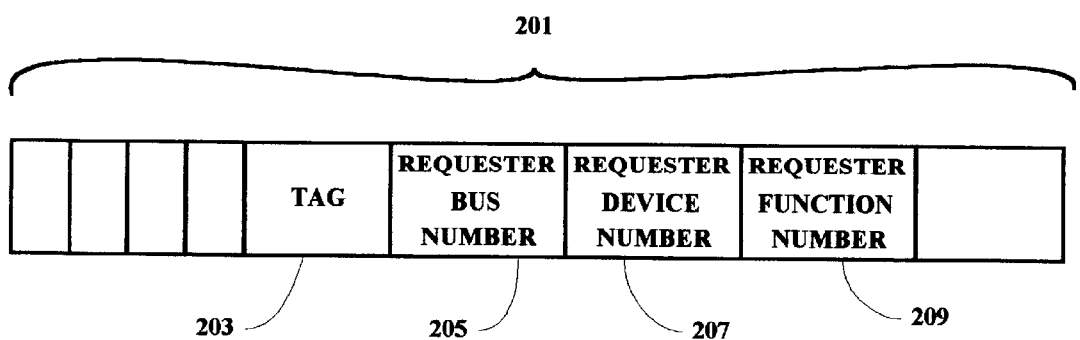
FIG. 2 is an exemplary segment of information transferred during an attribute phase of a system transaction within the computer system illustrated in FIG. 1.

As shown in FIG. 2, the attribute format 201 includes several segments which comprise a sequence ID and identify the transaction requester information. A tag segment 203 includes a sequential or chronological assignment of the request. A requester bus number segment 205 identifies a requester bus number for the transaction requesting device and a requester device number segment 207 identifies the particular device which is requesting the transaction. Also, a requester function number segment 209 identifies the specific function number of the device requesting the transaction for devices that have multiple functions. With the information contained in the illustrated format 201, each transaction is associated with a particular function and sequence of an identified PCI adapter for example on a particular PCI bus. In accordance with the present invention, when an error or fault condition is detected, the requested device is identified with the transaction information, and specific corrective action may be taken relative to the specific device associated with the transaction request. Whenever an error occurs for example, on a secondary PCI bus under a bridge circuit, further transactions from or to the particular PCI adapter can be "frozen", and the bridge will "bit-bucket" future writes to or from that PCI adapter, and will return all "1's" with an error condition on a split read completion to or from that PCI adapter. When the corresponding PCI slot is frozen, the bridge immediately above the PCI adapter will not grant the bus to the adapter at that slot. The frozen status of the PCI adapter is kept based on the PCI adapter's bus number, device number and function number of the adapter.

When an error occurs at the primary bus above a bridge circuit with the bridge circuit as the master, improved error recovery and error isolation is achieved through the use of the bus number and device number which are identified in the transaction attribute phase. If the error was an invalid TCE access for example, the PHB can shut-down the adapter that initiated the request. This can be accomplished by re-setting the adapter or by intercepting transactions to or from that adapter, for example. In this manner, whenever appropriate, only the failing device needs to be shut-down following an error condition rather than the whole bus.

Figure 3:
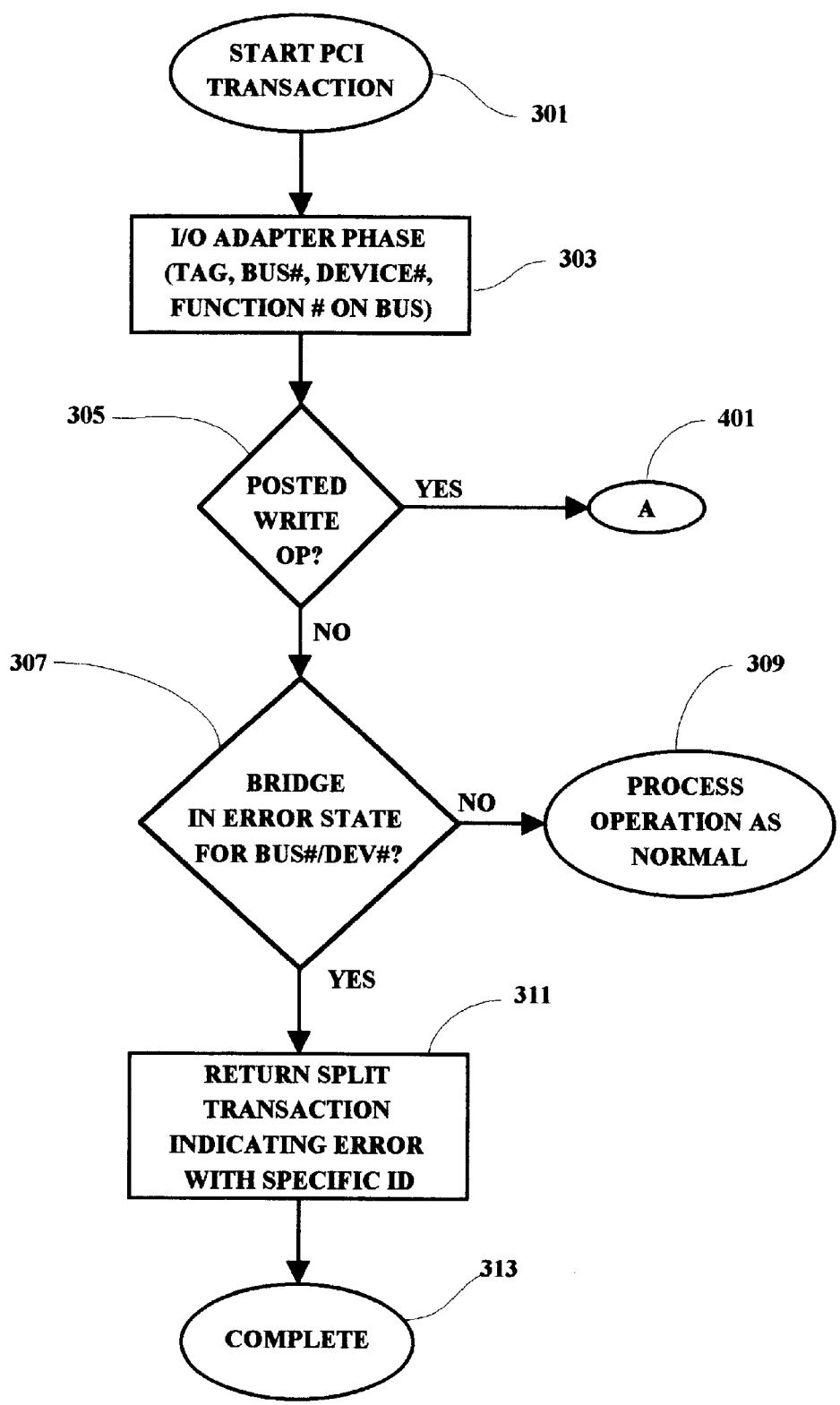
FIG. 3 is a flowchart illustrating an exemplary operational sequence for the disclosed methodology.

FIG. 3 illustrates an exemplary flow sequence which may be implemented in connection with the present invention. As shown, after a PCI transaction starts 301, the I/O adapter phase is initiated 303. A check is made to determine if the requested transaction is a posted write operation 305. If so, the method continues to point A 401 in the flow which is further explained in FIG. 4. If, however, the requested transaction is not a posted write operation 305, a check is then made to determine if the bridge is in an error state 307 for the bus and device number identified in the attributes of the requested transaction. If there is no error state, the processing of the requested transaction continues in a normal manner 309. If there is detected an error state for the specific bus number and device number requesting the transaction 307, then a split transaction is returned 311 for corrective action indicating an error condition and also identifying the specific bus, device, function and tag associated therewith, and the process is complete 313.

Figure 4:
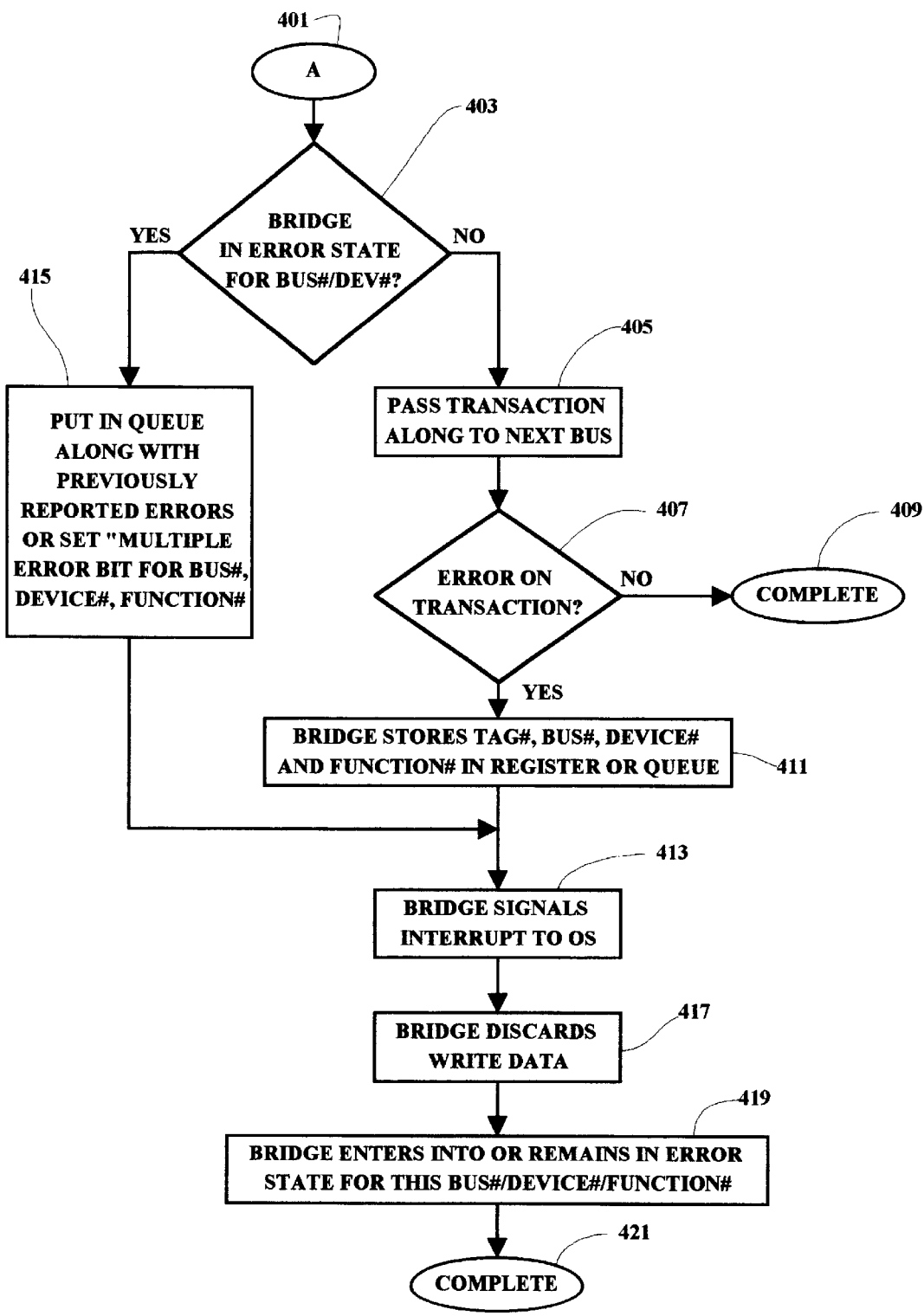
FIG. 4 is a continuation of the flow chart of FIG. 3.

If a posted write operation is requested 305, the process moves to step 401 in FIG. 4, and a check is made 403 to determine if the bridge is in an error state for the bus number and the device number of the requesting device. If no error state is detected, the transaction is passed along to the next bus 405 and another check is made to determine if there was an error on that transaction 407. If not the process completes 409. If an error on the transaction was detected 407, then the bridge stores the tag number, bus number, device number and function number in a register or queue 411, and the bridge signals an interrupt to the operating system (OS) for example. If the bridge was determined to be in an error state for the bus number and device number in step 403, then the process puts the transaction in a queue along with previously reported errors, or sets a "multiple error bit" for the bus number, device number and function number 415 and then proceeds directly to step 413 to signal the OS. Next, in the exemplary embodiment, the bridge discards the write data 417 and enters into or remains in an error state for the particular bus number, device number and function number 419 and the process completes 421.

Figure 5:
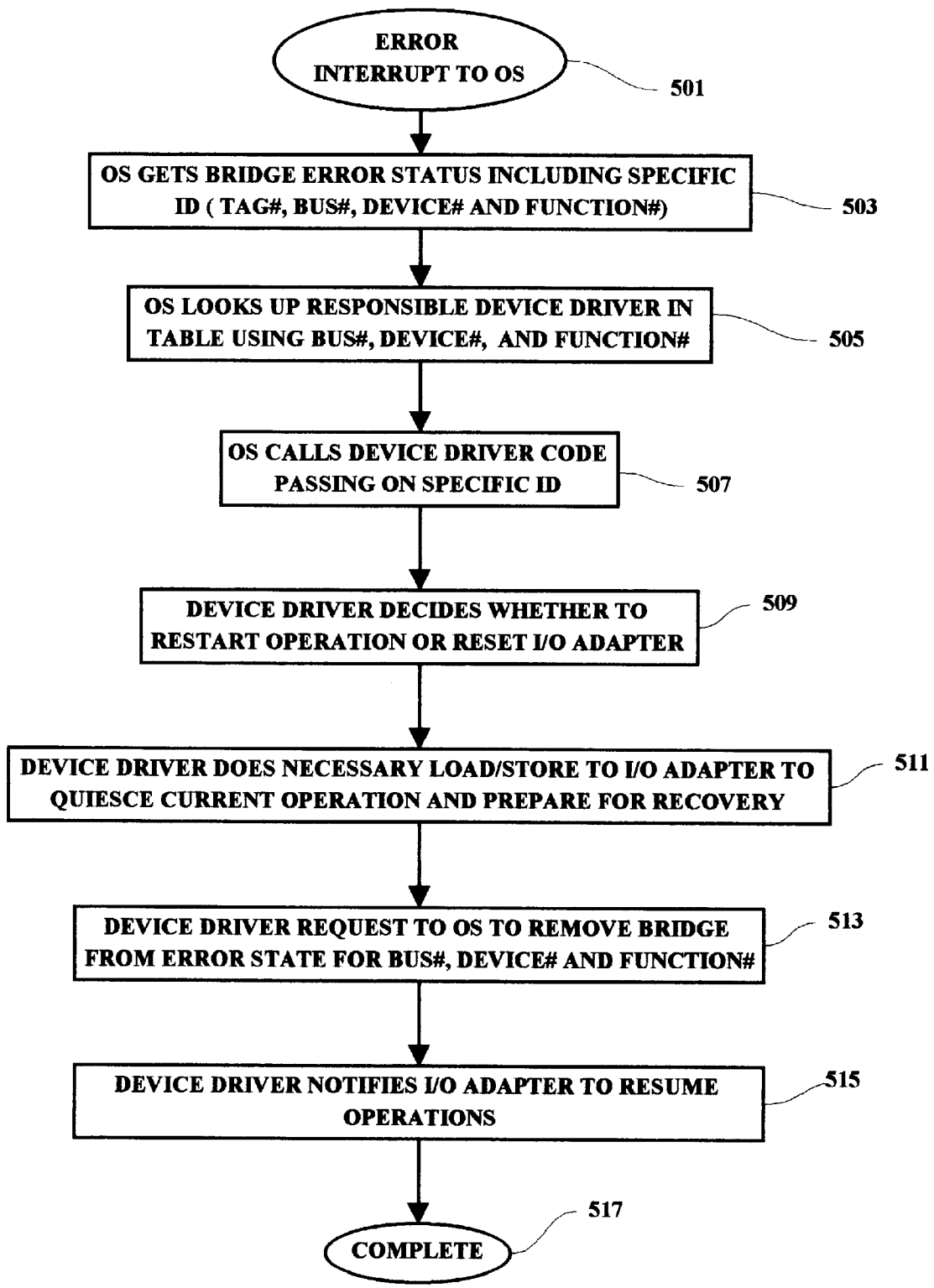
FIG. 5 is a software flowchart for an exemplary implementation of the present invention.

In FIG. 5, there is shown an exemplary software flow for the illustrated implementation of the present invention. As shown, when an error interrupt is reported to the OS 501, the OS gets the bridge error status including the specific identification of the transaction 503, i.e. the tag number, the bus number, the device number and the function number.

Next, the OS look-up the responsible device driver in a table using the specific identification (ID) provided 505. The OS then calls 507 the device driver code and passes on the specific ID. The device driver then decides whether to restart the operation or reset the identified I/O adapter 509. The device driver then does the necessary load/store to the I/O adapter to quiesce the current operation and prepare for the recovery 511. The device driver then requests the OS to remove the bridge from the error state for the bus number, the device number and the function number 513. Next the device driver notifies the I/O adapter to resume operations 515 and the process completes 517.

The method and apparatus of the present invention has been described in connection with a preferred embodiment as disclosed herein. The disclosed methodology may be implemented in many different ways to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing an error condition in an information transfer within a computer system, said method comprising:

detecting an error condition related to said information transfer;

determining an identification of an initiating device responsible for initiating said information transfer and an initiating bus to which said initiating device is connected;

associating said identification of said initiating device with said error condition of said information transfer;

initiating action to correct said error condition; and processing information transfers to and from devices on said initiating bus other than said initiating device while rendering ineffective information transfer requests to and from said initiating device until said error condition is corrected.

2. The method as set forth in claim 1 wherein said computer system is a PCI-related computer system, said identification including a bus number a device number and a function number specific to said initiating device.

3. The method as set forth in claim 2 wherein identification information relating to said initiating device is transferred from said initiating device to an intermediate bridge buffer during an attribute phase of said information transfer.

4. The method as set forth in claim 1 and further including:

isolating said initiating device from further operations within said computer system after said associating.

5. The method as set forth in claim 4 and further including:

reporting said error condition and said identification information to an operating system of said computer system.

6. The method as set forth in claim 5 wherein said operating system is operable in response to said reporting for effecting corrective action to be taken to enable a recovery of said initiating device.

7. The method as set forth in claim 6 wherein said corrective action includes calling device driver code for a device driver of said initiating device.

8. The method as set forth in claim 7 wherein said corrective action includes restarting said information transfer.

9. The method as set forth in claim 7 wherein said corrective action includes resetting said initiating device.

10. The method as set forth in claim 1 wherein said identification of said initiating device includes information identifying a tag number, said tag number being representative of a sequence position of said information transfer among a plurality of information transfers.

11. The method as set forth in claim 6 and further including:

maintaining a memory of said error condition and said initiating device; and removing said memory of said error condition and said initiating device when said error condition is corrected.

12. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective for processing an error condition in an information transfer within said computer system, said program signals being further effective for:

detecting an error condition related to said information transfer;

determining an identification of an initiating device responsible for initiating said information transfer and an initiating bus to which said initiating device is connected;

associating said identification of said initiating device with said error condition of said information transfer;

initiating action to correct said error condition; and processing information transfers to and from devices on said initiating bus other than said initiating device while rendering ineffective information transfer requests to and from said initiating device until said error condition is corrected.

13. An information processing system comprising:

a system bus;

a processor device coupled to said system bus; and memory means coupled to said system bus, said information processing system being selectively operable for processing an error condition in an information transfer within said information processing system by detecting an error condition related to said information transfer, and determining an identification of an initiating device responsible for initiating said information transfer and an initiating bus to which said initiating device is connected, said information processing system being further effective for associating said identification of said initiating device with said error condition of said information transfer, and initiating action to correct said error condition, said information processing system being further effective for processing information transfers to and from devices on said initiating bus other than said initiating device while rendering ineffective information transfer requests to and from said initiating device until said error condition is corrected.

* * * * *